Oct. 27, 1942.    W. H. DE LANCEY    2,300,145
LIQUID DISPENSING APPARATUS
Filed July 24, 1940    4 Sheets-Sheet 1
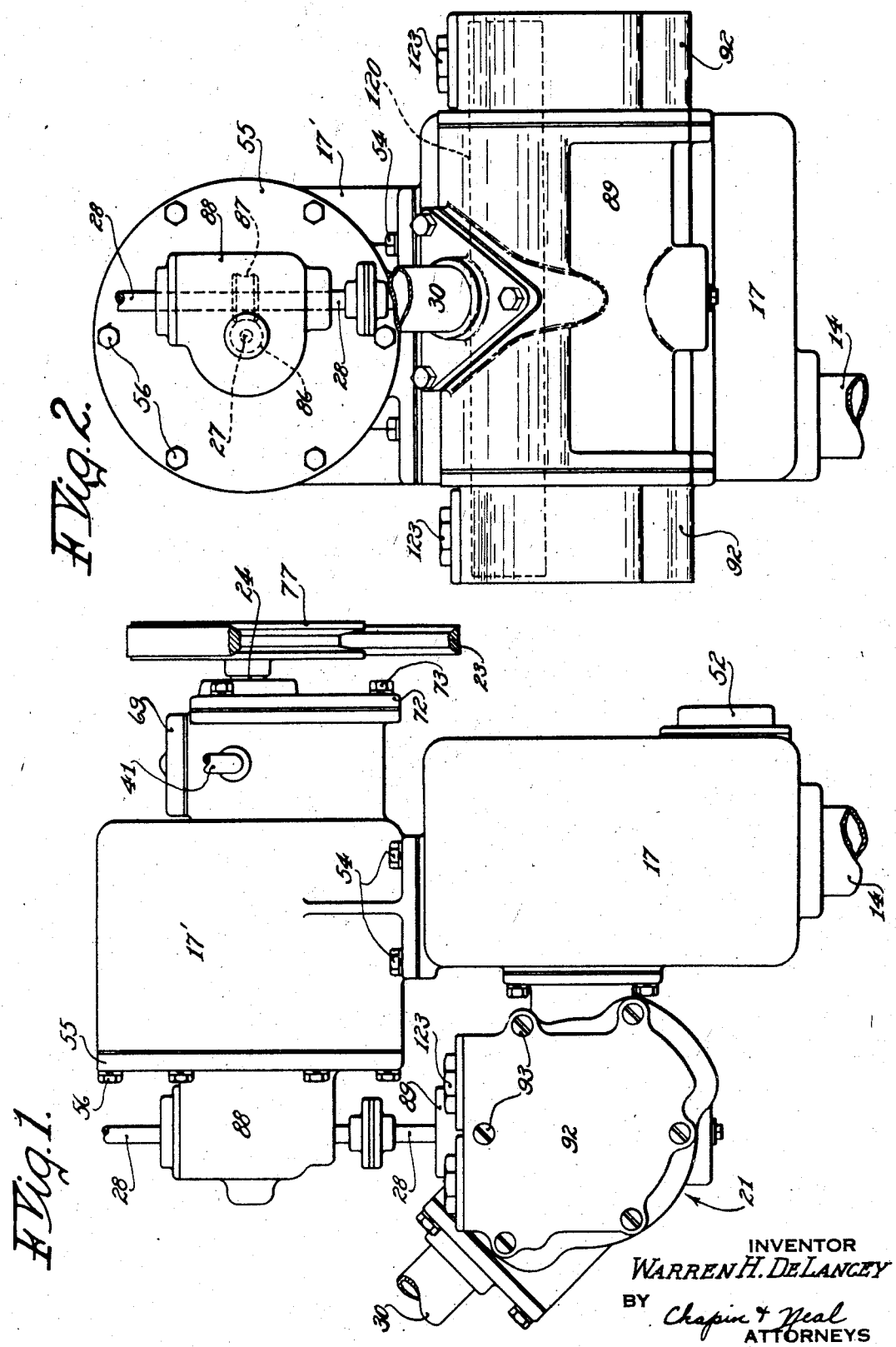
INVENTOR
WARREN H. DE LANCEY
BY Chapin & Neal
ATTORNEYS Oct. 27, 1942.　　W. H. DE LANCEY　　2,300,145
LIQUID DISPENSING APPARATUS
Filed July 24, 1940　　4 Sheets-Sheet 2
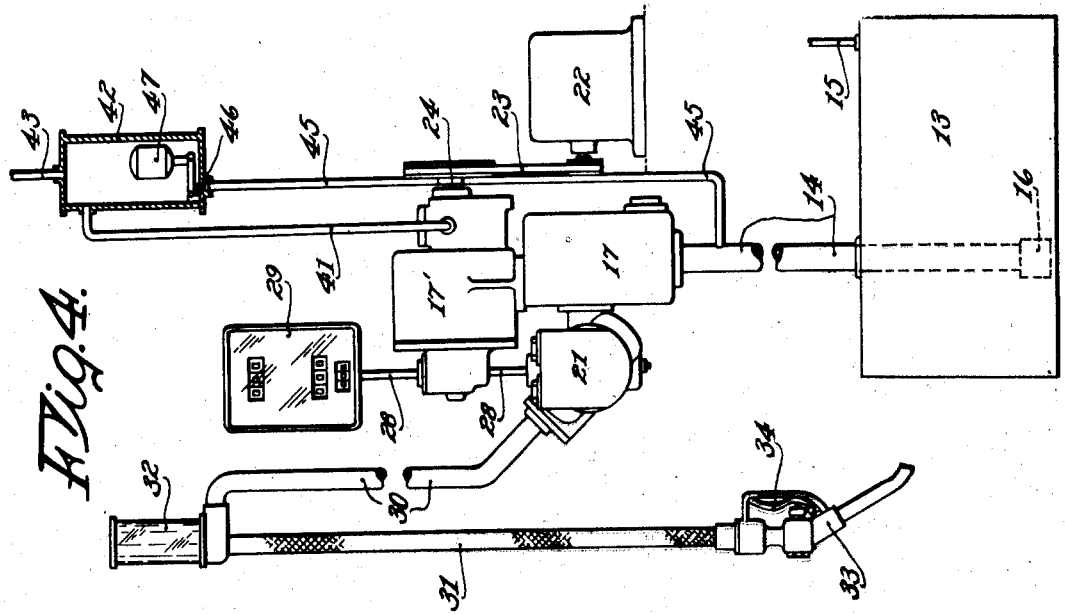
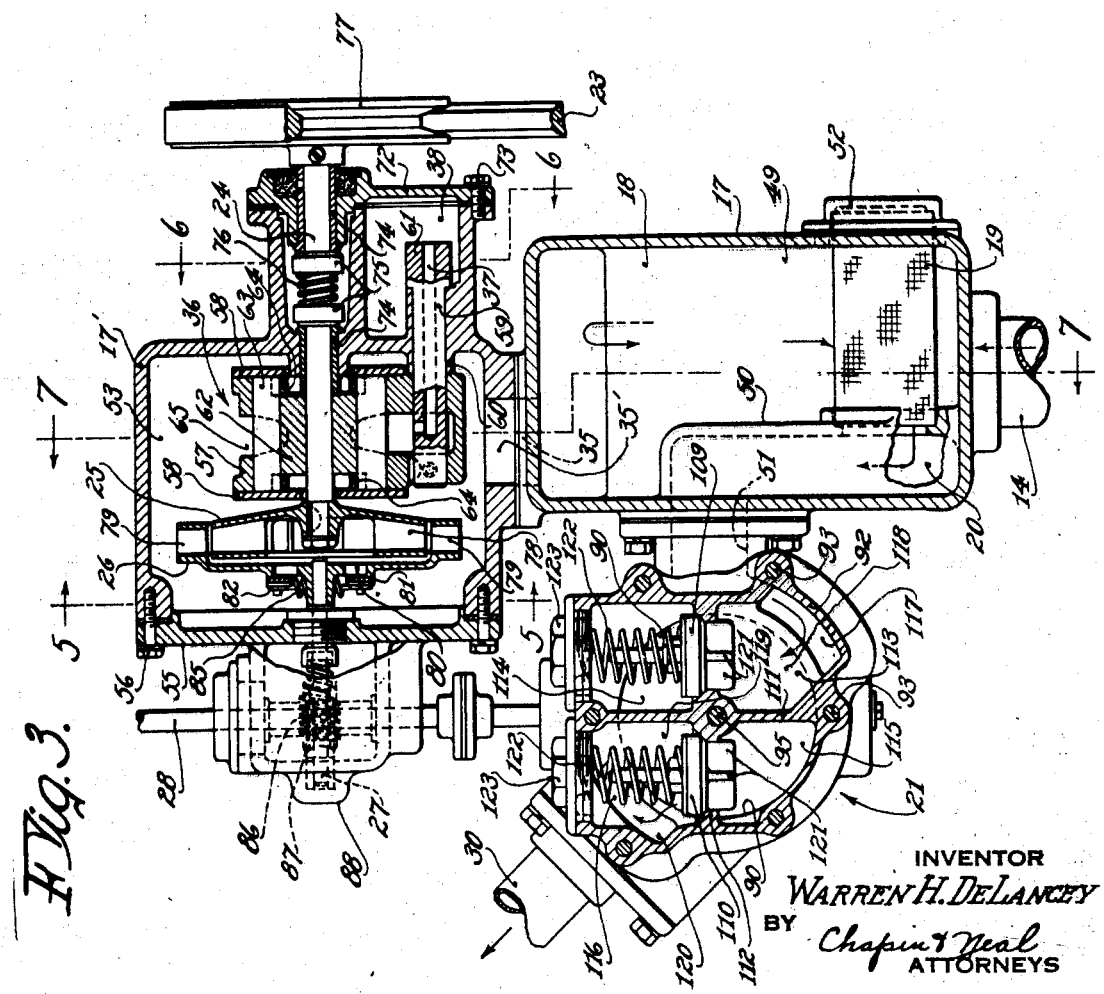
INVENTOR
*Warren H. DeLancey*
BY *Chapin & Neal*
ATTORNEYS

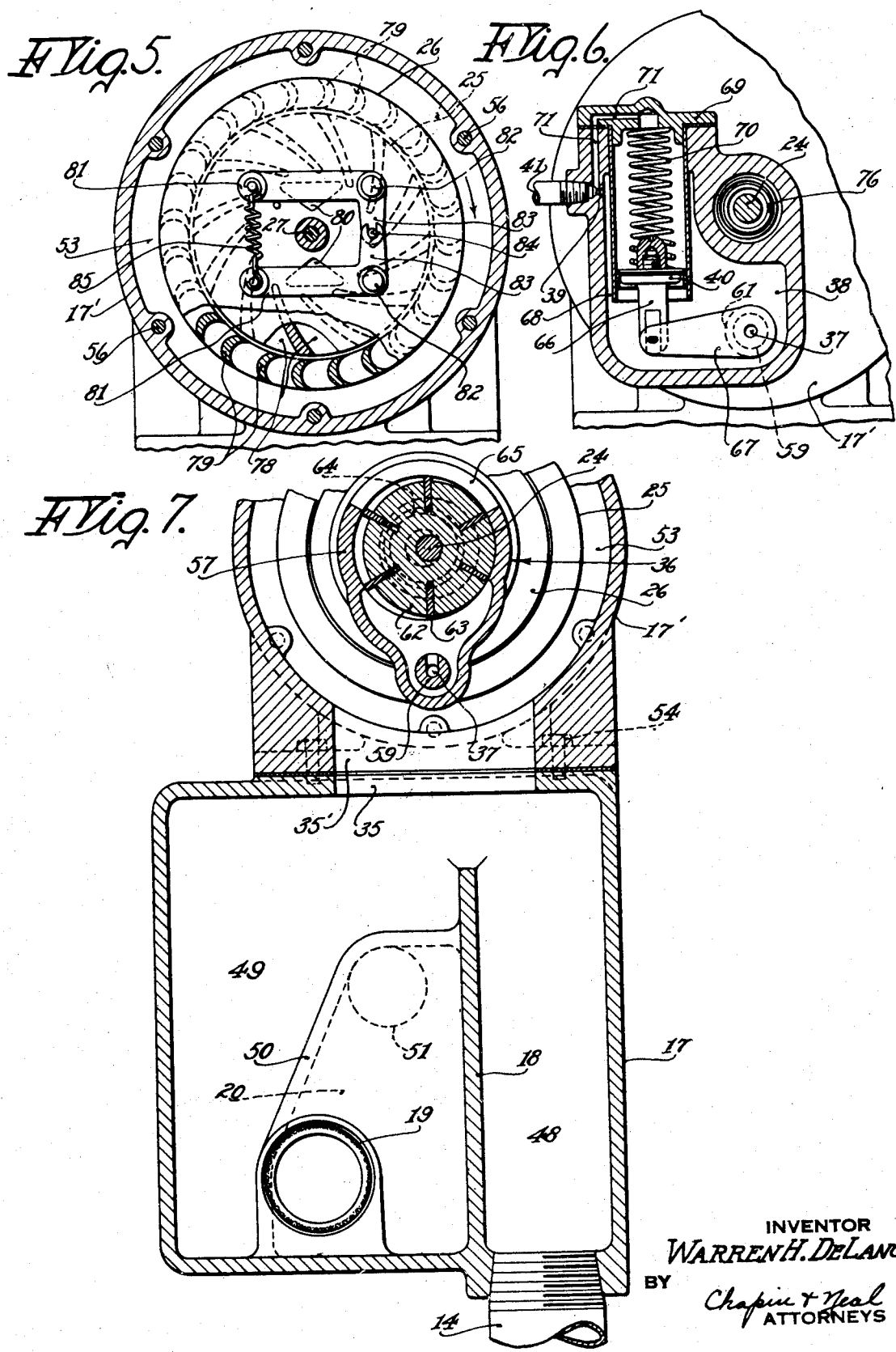
Oct. 27, 1942. W. H. DE LANCEY 2,300,145
LIQUID DISPENSING APPARATUS
Filed July 24, 1940 4 Sheets-Sheet 3
INVENTOR
WARREN H. DeLANCEY
BY Chapin + Neal
ATTORNEYS Oct. 27, 1942. W. H. DE LANCEY 2,300,145
LIQUID DISPENSING APPARATUS
Filed July 24, 1940 4 Sheets-Sheet 4
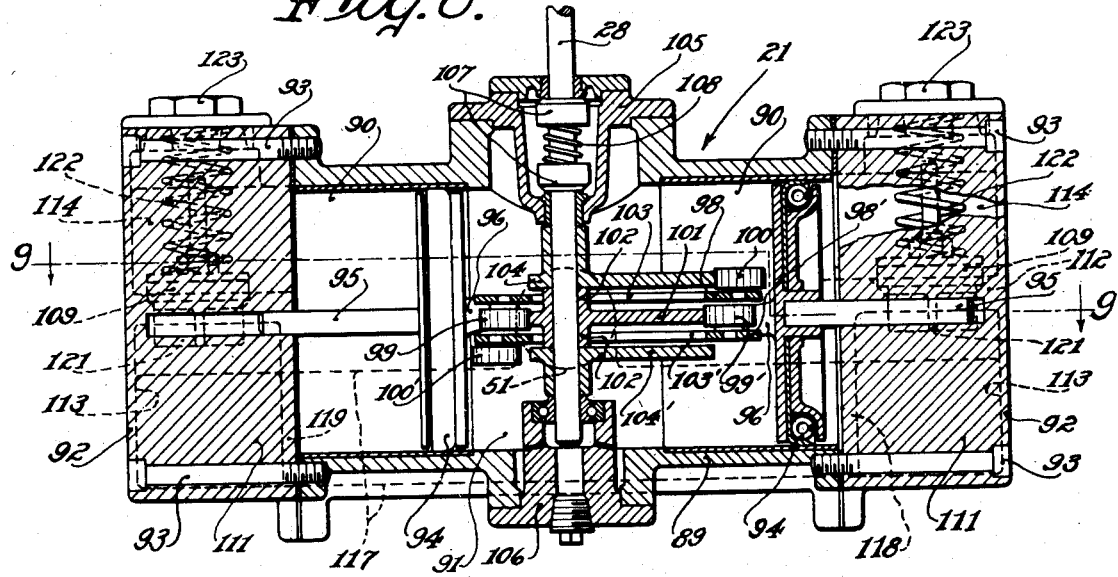
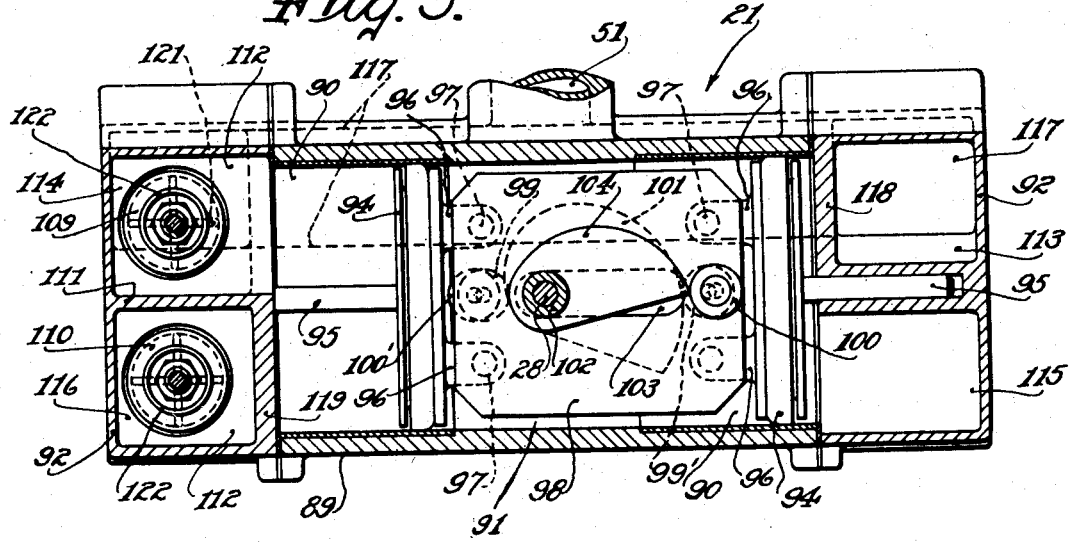
INVENTOR
WARREN H. DE LANCEY
BY Chapin + Neal
ATTORNEYS Patented Oct. 27, 1942

2,300,145

UNITED STATES PATENT OFFICE 2,300,145

LIQUID DISPENSING APPARATUS

Warren H. De Lancey, Springfield, Mass., assignor to Gilbert & Barker Manufacturing Company, West Springfield, Mass., a corporation of Massachusetts Application July 24, 1940, Serial No. 347,288

16 Claims. (Cl. 73—200)

This invention relates to improvements in apparatus for dispensing and measuring liquids, such for example as gasoline and the like.

It has been common practice heretofore to provide in apparatus of this kind a motor-driven pump for raising the liquid from a low-level storage tank and forcing it in the order named through an air separator, a meter and a delivery conduit,—the latter usually terminating with a valved hose nozzle. Actually, the meter is a motor actuated by the liquid forced into it under pressure by the pump and serving to drive any suitable registering apparatus for indicating the quantity and/or cost of the liquid dispensed. The pump must not only develop sufficient pressure to raise the liquid the desired distance and discharge it at the desired rate through the delivery conduit but it must also develop sufficient additional pressure to operate the meter and carry the load of the registering mechanism imposed on the meter. In recent years the load imposed on the meter has been increased to such an extent that it has become necessary to use meters of the displacement type and make them with closely fitting pistons in order to avoid as far as possible leakage of liquid under the high pressure which it has been necessary to use. Many present day gasolines also have a gum content which tends to cause the pistons and valves of the meter to stick and the more closely fitted the pistons are, the more liable they are to stick. The prior practice described is far from satisfactory, necessitating as it does the use of relatively high pressures (from 18 to 20 lbs. per square inch) and lacking a positive and uniformly reliable drive of the registering mechanism under all conditions of service.

The present invention is based on the use of a metering-pump, mechanically and positively driven from a motor which is also mechanically connected to the registering mechanism to positively drive the latter. The pump is constructed to displace uniform quantities of liquid for uniform increments of rotation of its drive shaft, as does the displacement meter in common use today, and the registering mechanism, being driven in unison with the pump, indicates the measured quantities dispensed. However, the load of the registering mechanism is borne directly and entirely by the driving motor and so also is the friction load of the metering pump. The pump, then, need develop only so much pressure as is necessary to raise the liquid the required distance and discharge it at the desired velocity from the delivery conduit. A substantial reduction in pressure (from 30 to 40 percent) can be effected in this way and there results materially lessened liability of leakage in the meter and elsewhere, and lessened fire hazard. Also, the pistons and valves of the meter need not be fitted with such close accuracy, thereby enabling important savings in cost without sacrifice to the efficiency of the apparatus, and also lessening the liability of the pistons and valves sticking.

Since the invention is based on the use of a pump which also serves as a meter, it is essential that operation of the pump on air or gases be positively prevented and the provision of means for this purpose constitutes one of the objects of this invention.

The invention also has for one object the provision of improved means for separating from the liquid before it is drawn into the metering pump any air or gases that may be carried therein and, since this separation is effected on the suction side of the metering pump, the separation can be made more effectively under the prevailing condition of partial vacuum than it can be under the heavy pressures of 18 to 20 lbs. per square inch heretofore used. Also, there is less of a fire hazard since leakage, if any, will be into the separator and not out of it as was possible according to prior practice with the heavy superatmospheric pressures used.

The invention has for a further object to provide a scavenging means,—preferably a positively-acting displacement pump,—for removing air and gases from the separator and condensing the gases so that no substantial loss of fuel vapor is likely to occur.

The invention has for a further object to provide means for varying the capacity of the scavenging pump according to the need for scavenging,—the control being responsive to the presence or absence of liquid under pressure at the outlet of the scavenging pump and causing a decrease or increase, respectively, in the rate of pumping.

The invention has for a further object to provide between the metering pump and its driving motor a slip clutch, arranged to slip when liquid is not present in the upper part of the separator. The same arrangement also serves to unload the driving motor when the valve of the hose nozzle is closed and relieves the motor of the load of the metering pump.

The invention has for a further object to provide as a preferred form of slip clutch for the purposes above set forth, a hydraulic clutch connected to the upper part of the air separator and operative only by the presence of liquid in said part.

These and other objects will best be understood as the detailed description proceeds and they will be pointed out in the appended claims.

The invention will be disclosed with reference to the accompanying drawings, in which:

Figs. 1 and 2 are side and front elevational views, respectively, showing an assembly including a metering pump and an air separating means embodying the invention;

Fig. 3 is a sectional view of said assembly;

Fig. 4 is a diagrammatical view of a gasoline dispensing apparatus embodying said assembly;

Figs. 5, 6 and 7 are cross sectional views taken on the lines 5—5, 6—6 and 7—7, respectively, of Fig. 3;

Fig. 8 is a sectional elevational view of the metering pump; and

Fig. 9 is a sectional plan view taken on the line 9—9 of Fig. 8.

Referring to these drawings and first to Fig. 4, liquid such as gasoline is drawn up from a low level storage tank 13 through a suction pipe 14 into a separator 17. The tank has the usual vent 15 and pipe 14 has the usual foot valve 16. As indicated in Fig. 3, liquid passes upwardly in back of a dam-like partition 18, flows over the upper edge of the latter into the separating chamber and passes downwardly to and through a fine screen 19 into a passage 20 which leads to the intake of a metering pump 21. Pump 21 is driven by an electric motor 22 (Fig. 4) through a belt connection 23 to a shaft 24, which through a hydraulic transmission 25—26 (Fig. 3) drives a shaft 27 that is connected to the driving shaft 28 of the pump. This driving shaft 28 also operates registering mechanism 29 of any suitable kind for indicating the quantity and/or cost of the liquid dispensed. The pump 21 discharges the liquid through a delivery conduit, herein shown as including a fixed pipe 30 and a flexible hose 31 with an optionally-interposed visible discharge indicator 32 of any suitable type. The delivery conduit terminates with a valved hose nozzle 33 of usual form, the valve of which tends to close automatically but may be opened manually by hand lever 34.

The separator includes an upper casing 17' in constant communication with the lower portion 17 through registering ports 35 and 35' formed respectively in casings 17 and 17'. In the casing 17' (Fig. 3) are the hydraulic transmission 25—26 and a variable-capacity, positively-acting displacement pump 36. Pump 36 is driven continuously during each dispensing operation from shaft 24 and serves to scavenge the separator of air and the suction pipe also if necessary, whenever required. The air or mixed air and liquid or liquid removed by pump 36 is delivered through a passage 37 into a chamber 38. This chamber (Fig. 6) has a continuously open vent passage 39 which will freely pass all the air that pump 36 can pump. However, the restricted vent offers more resistance to the outflow of liquid. Accordingly, as liquid fills chamber 38, pressure builds up therein. This pressure is made to lift a piston 40 which functions to vary the capacity of pump 36 in a manner to be later described. The discharge through vent 39 is conducted by a pipe 41 to a secondary separator 42 (Fig. 4). Separator 42 has a constantly open vent 43 to pass off the separated air to the atmosphere. In the base of separator 42 is an outlet connected by a pipe 45 to the suction pipe 14 for passing separated liquid back to the primary separator 17. The outlet is controlled by a valve 46 connected to a float 47 so as to open the valve when the liquid accumulates in separator 42 above a predetermined level and return liquid to the primary separator and so as to close the valve when the liquid falls below said level.

Referring now to Figs. 3 and 7, the primary separator includes two chambers 48 and 49 which are formed within the casing 17 and are disposed side by side therein. The dam 18 separates these chambers and is stopped off short of the top wall of casing 17 to provide the only means of communication between these chambers. The chamber 48 functions as a part of the inlet passage, constituting an extension of pipe 14 for delivering liquid into separator chamber 49 at a level substantially above the bottom thereof and at substantially reduced velocity. There is no other inlet to the separator. A wall 50 in casing 17 partitions off a part of chamber 49 to form the outlet conduit 20 which leads from the lower part of the chamber upwardly and thence outwardly at right angles to communicate with a registering inlet passage 51 in the meter-pump. Conduit 20 is the only outlet for substantially air-free liquid. The screen 19 is preferably of very fine mesh and designed to restrain the passage of air bubbles therethrough. This screen at one end is fixed to a nut 52 which threads into an opening in a side wall of the casing 17. The screen extends transversely across chamber 49 near the lower part thereof and its other end fits into a socket formed in wall 50. Liquid from chamber 49 passes radially through this screen and thence axially thereof into passage 20, through which it rises and passes into meter-pump 21. The liquid, on entering chamber 48, is lowered in velocity to facilitate release of any air or gases entrapped therein. Such air and gases are liberated to a considerable extent as the liquid passes over the dam 18 but any air which may be carried downwardly with the liquid in chamber 49 is restrained by screen 19 from passing into the meter pump. Separation of air and liquid occurs on the suction side of the pumps 21 and 36 and thus at sub-atmospheric pressure, the better to release any air and gases that may be entrapped in the liquid. The casing 17 is liquid tight and the only openings leading into or out of it are outlet passage 20, the port 35, and the port connected to pipe 14.

The separator also includes an upper chamber 53, formed within the casing 17' which is superposed on casing 17 and suitably secured thereto as by cap screws 54. Conveniently, one end wall 55 of casing 17' is made removable to enable assembly of the parts in chamber 53, and this wall is suitably secured as by cap screws 56 to casing 17'. Chamber 53 is also made liquid tight,—its only inlet being the registering ports 35 and 35' and its only outlet the passage 37 which leads to control chamber 38. The inlet afforded by said ports is preferably relatively large in area as compared to the other ports in casing 17 for the purpose of getting the air into and the liquid out of the chamber 53 as rapidly as possible. For example, in case of a sudden inrush of air into chamber 48, as by exhaustion of the supply of liquid in tank 13, it is desired to get this air into chamber 53 through the registering ports 35 and 35' and at the same time allow the liquid in chamber 53 to drain back through these same ports into the underlying chamber. The more quickly that a change from liquid to air or from air to liquid in chamber 53 can be effected, the more quickly will the elements in this chamber respond and perform their intended functions.

One of such elements is the scavenging pump 36 which is of variable capacity and is intended to work at full capacity on a sudden inrush of air, such as above described, or for quick priming whenever necessary. This pump is of the positively-acting displacement type and is best shown in Fig. 7. It includes a stator body 57 having a cylindrical opening therethrough which opening is closed by end plates 58 suitably secured one to each of the end faces of the body. This stator, at a location below said opening, is fixed to a shaft 59 which is mounted to turn in a bearing 60 formed in one end wall of casing 17'. Stud 59 is drilled to form the described outlet passage 37 for pump 36, such passage communicating at one end with the lower part of the space within the stator and at the other end with the chamber 38. Shaft 59 has an enlarged part 61 which abuts one end of bearing 60, the other end of which is engaged by the body 57. Mounted within the cylindrical opening in the body 57 is a cylindrical rotor 62 extending between the end plates 58. This rotor, which is suitably fixed to shaft 24, is radially slotted at angularly-spaced intervals to slidably receive a series, as six, of blades 63. Each end face of the rotor is recessed to receive an annular ring 64. These rings hold the outer edges of the blades 63 in engagement with the wall of the cylindrical opening. The end plates 58 have openings therein through which shaft 24 passes and such openings are large enough to enable the stator to be shifted, by turning shaft 59 within the necessary limits to secure the desired range of capacities. The capacity of pump 36 is varied by moving the axis of the cylindrical opening in the stator toward or away from the axis of rotor 62 and this decreases or increases, respectively, the capacity. For example, the pump 36 may have a maximum capacity of 20 gallons per minute and a minimum capacity of say 2 gallons per minute. The pump inlet 65 constantly communicates with the upper portion of chamber 53.

Referring now to Fig. 6, it will be noted that the described piston 40 has a short and depending piston rod 66, the lower end of which is pivotally connected to one end of an arm 67. The other end of this arm is fixed to the enlarged part 61 of shaft 59. The piston is mounted in a vertical cylinder 68, the upper end of which is fixed to a cap 69, suitably secured to and closing a cylindrical opening in the top wall of chamber 38. A spring 70 inside cylinder 68 acts between cap 69 and piston 40 to urge the latter downwardly and cause pump 36 to be moved into the position of maximum capacity. When chamber 38 fills with liquid, a pressure is built up therein sufficient to lift the piston and move the stator of pump 36 into its position of minimum capacity. The vent 39 is of substantially less cross sectional area than passage 37. Hence the pressure will rise in chamber 38 whenever it fills with liquid. A passage 71 formed in the walls of chamber 38 interconnects the upper end of cylinder 68 and vent 39. The chamber 38 has a removable end wall 72 held in place as by cap screws 73, to enable access to the interior of the chamber for the assembly of the parts therein.

The drive shaft 24 for pump 36 is supported in a pair of spaced bearings 74 mounted one in plate 72 and one in the opposite wall of chamber 38. Seal rings 75 mounted on shaft 24 are pressed apart by a spring 76 to engage one with each of said bearings to prevent leakage from chamber 38 along the shaft. At its outer end shaft 24 has fixed thereto a pulley 77 to receive the driving belt 23 of motor 22.

The hydraulic clutch between shafts 24 and 27 has the function of driving the meter-pump when and only when there is liquid in the chamber 53. This chamber need not necessarily be filled with liquid but some liquid must be present and when only air is present the shaft 27 and thus the meter pump 21 cannot be operated from shaft 24 and motor 22. This clutch is best shown in Figs. 3 and 5. The driving member 25, which is fixed to shaft 24, is constructed like the impeller of a centrifugal pump, having a series of passages 78 extending outwardly from the center to the periphery of the member and curving backwardly with respect to the direction of rotation as shown. Liquid entering at the center of member 25 enters all said passages and is thrown outwardly therefrom at high velocity. The driven member 26 which is fixed to the inner end of shaft 27, has a circular series of buckets 79 positioned to receive the liquid discharged through passages 78. The member 25 telescopes in the member 26. Liquid from chamber 53 enters through ports 80 in the circular, plate-like portion of member 26 and enters the central or eye portion of member 25 to be discharged through passages 78 into the surrounding buckets 79, whereby to turn member 26 from member 25. Cooperating with each port is a valve 81, pivoted on a stud 82, fixed to member 26. These valves have arms 83, one on each, which extend toward one another and which are interconnected by the pin and slot connection 84, whereby to move in unison. A spring 85 interconnects the free ends of valves 81 and tends to hold them positioned as shown to provide minimum openings of ports 80. These valves respond to the speed of member 26 and move outwardly by centrifugal force to uncover the ports and admit more liquid to the impeller member 25. Each port is more or less triangular in shape and its valve 81 initially closes all but the apex portion of the triangular port. As the valve 81 opens, each successive increment of valve movement results in a much greater increment of port opening, whereby liquid is admitted to the impeller at progressively increasing rates as the speed of member 26 increases. The purpose of this arrangement is to secure increased torque with increased speed of the driven element. The normal tendency is for the torque to decrease as the speed of the driven element increases. However, by increasing the quantity of liquid admitted as the speed of the driven element increases, the aforesaid tendency is not only overcome but the torque is made to increase as the speed of the driven element increases, thereby to afford the necessary driving power for the pump to cause it to deliver the liquid through conduit 30, 31 at the desired high velocity.

The shafts 27 and 28 are interconnected in any desired way to secure the desired speed ratio. As shown, a worm 86 is fixed on shaft 27 and drives a worm gear 87 fixed on shaft 28, so that shaft 28 moves at one tenth the speed of shaft 27. This worm and gear are enclosed in a housing 88 formed as an integral part of end wall 55.

The meter-pump 21 is best shown in Figs. 3, 8, and 9. It includes a cylinder block 89 formed with two axially-aligned cylinders 90, opening at their inner ends into a central chamber 91, through which the drive shaft 28 passes. The outer end of each cylinder is closed by a head 92 secured to block 89 by cap screws 93. Mounted one in each of said cylinders are pistons 94, each having fixed to its outer face a rod 95 slidably mounted in the adjacent head 92. Fixed to the inner face of each piston are a pair of lugs 96. Fixed to the pair of lugs 96 of the left hand piston, as by rivets 97, is an upper plate 98 and similarly fixed to the pair of lugs 96 of the right hand piston is a lower plate 98'. Plate 98 has mounted thereon two rolls 99 and 100, disposed at opposite ends of the plate and one above and one below the plate,—the axis of both rolls lying in a vertical plane which includes the axis of shaft 28. Similarly mounted on plate 98' are corresponding rolls 99' and 100'. The rolls 99 and 99' are disposed at the same level and both engage the same cam 101 but at diametrically opposite points thereon. Cam 101 is fixed centrally to shaft 28 and its oppositely directed hubs 102 enter one in each of two longitudinal slots 103 and 103' formed, respectively, in plates 98 and 98'. The one cam 101 serves to move both pistons outwardly on their discharge strokes. The return or suction stroke of each piston is effected by a separate cam. Thus, cams 104 and 104', fixed on shaft 28, respectively above and below plates 98 and 98' are provided to engage the rolls 100 and 100', respectively. Cam 104 has just completed the suction stroke of the left hand piston and cam 101 is about to start the discharge stroke of such piston. The discharge strokes of the two pistons overlap to some extent as will be noted from Fig. 9, which shows that the cam 101 has not quite completed the discharge stroke of the right hand piston at the time the discharge stroke of the left hand piston is started. However, there is clearance between the cam 104' and roll 100' and these two elements will not engage until the discharge stroke of the right hand cylinder has been completed.

The drive shaft 28 is rotatably supported in suitable bearings formed in upper and lower removable members 105 and 106. The upper member 105 is chambered to receive a pair of seal rings 107 and a spring 108, all mounted on shaft 28. The spring forces the rings axially apart to engage the adjacent end faces of two shaft bearings and thus prevents leakage from the meter pump around shaft 28.

Liquid enters and leaves each cylinder through the head 92, in which are mounted the inlet and outlet valves 109 and 110, respectively. Each head 92 is hollow and is divided by vertical and horizontal partitions 111 and 112 respectively, into four chambers 113, 114, 115 and 116. The two chambers 113 are interconnected by a cored passage 117 formed in the cylinder block 89 and heads 92 and connected centrally to the above described inlet passage 51. Communication between chamber 113 and cylinder 90 is blocked by a wall 118. Above chamber 113 there is an opening through the partition 112 and the inlet valve 109 controls this opening. Chamber 114 communicates with the outer end of cylinder 90 as will be clear from Figs. 3 and 9. Chamber 115 likewise communicates with said end of cylinder 90 as will be clear from Figs. 3 and 9. Above chamber 115 there is an opening in the overlying partition 112 and the outlet valve 110 controls this opening. Communication between chamber 116 and cylinder 90 is blocked by a wall 119. The two chambers 116 are interconnected by a longitudinal passage 120, cored in the cylinder block 89 and heads 92 and connected at a point intermediate its ends to the above described delivery conduit 30. As each piston 94 moves on its inward and suction stroke, liquid is drawn in through the passages 51 and 117 into the chamber 113 for that piston. Outlet valve 110 will be closed and inlet valve 109 will open to allow liquid to pass upwardly from chamber 113 into the overlying chamber 114 and thence into the adjacent cylinder 90. On the discharge stroke valve 109 closes and liquid from cylinder 90 entering chamber 115 lifts valve 110 and enters chamber 116, passing out through passage 120 into the delivery conduit 30.

The inlet and outlet valves 109 and 110 may be constructed and mounted in any suitable manner. As shown, each valve has on its lower face a guide composed of a plurality of radiating webs 121, the outer edges of which slidably engage the wall of the valve opening. A spring 122, acting between the top face of the valve and a cap 123, tends to hold the valve to its seat. Each cap 123 is threaded into and normally closes an opening in the top wall of head 92. The valve and its spring are assembled through such opening, after which the cap is screwed in place.

The operation of the apparatus will next be described. Assuming that the apparatus has just been set up and the various pipes, the separator 17—17' and the metering pump 21 are filled with air, the apparatus will become primed by simply starting the motor 22. The scavenging pump 36 will be immediately operated but the metering pump 21 will not start because of the absence of liquid from the upper chamber 53 of the separator. No torque can be developed between the clutch elements by air alone. The scavenging pump commences work at its maximum rate,— say 20 gallons per minute,—and very quickly exhausts all air from suction pipe 14, and the inlet passage 48 of the separator. Liquid rises in said pipe and passage and eventually flows over dam 18 into separating chamber 49. Continued operation of pump 36 will remove the air from chamber 49 and then from the ports 35 and 35' and finally the chamber 53 so that liquid will rise into said chamber. As soon as liquid reaches one of the ports 80 of the hydraulic clutch, such liquid will enter the eye of the driving member 25 and be thrown out by the latter into the buckets 79 of the driven member 26. The metering pump 21 will then begin to operate provided, of course, that the valve of hose nozzle 33 is open as is necessary to initially prime the system. Operation of the metering pump will suck out all air from its inlet passages and eventually draw in liquid and subsequently expel it into the delivery conduit 30—31 to drive out all air therefrom. When liquid is delivered from the nozzle 33 its valve may be closed. The hydraulic clutch will then slip,—allowing continued operation of motor 22 without the load of the metering pump, which stops on closure of the nozzle valve. Slipping of the clutch occurs without causing wear of the parts and without the generation of much heat and without requiring much power from the motor.

The motor would normally be stopped as soon as priming is completed. However, before the motor is stopped liquid will have risen far enough in chamber 53 to enter the inlet of pump 65 and be expelled through outlet conduit 37 into the enlarged portion thereof,—the chamber 38. The restricted outlet 39 from this chamber readily passes all the air that pump 36 can deliver. However, it offers greater resistance to liquid. Accordingly, as liquid fills the chamber up to the level of vent 39, there will be a rise in pressure which will raise piston 40 against spring 70 and turn arm 67, shifting the stator of pump 36 in such a manner as to decrease its capacity. Such a shift immediately results in a decrease in pressure in chamber 38 because liquid is delivered thereto at a lower rate and the piston will move downward somewhat, causing an increase in the rate of pumping and an increase of pressure in chamber 38, thus raising the piston to increase the capacity of pump 36. Eventually a balance is established between the pressure of the liquid in chamber 38 and the pressure of the spring, and the pump 36 then operates steadily at a low rate, say 2 gallons per minute, unless and until conditions change. The pump 36, while operating continuously during each dispensing operation, will not consume much power because it is operating at a low rate and doesn't have to build up heavy pressures. All that is required is pressure enough to hold piston 40 raised and to lift the liquid a short distance to the separator 42, which is continuously open to the atmosphere. In separator 42, air and liquid separate by gravity action and the air passes off to the atmosphere through vent 43. The liquid accumulates in the lower part of separator 42 and is delivered from time to time whenever required, under the control of float operated valve 46, back to the separator 17.

In normal periods when the apparatus is idle, the delivery conduit, the metering pump 21 and all its passages and the separator chamber 49 (at least to the level of the top of dam 18) will be filled with liquid. And the upper separator chamber 53 and chamber 38 may likewise be filled with liquid. However, the piston 40 will be in its lowermost position and pump 36 will be in readiness to operate at its maximum rate when the motor 22 is again started. When motor 22 is started, a quick evacuation of any accumulated air is effected by pump 36 which, as herein disclosed, has a capacity greater than pump 21. If the chambers 53 and 38 are already filled with liquid, the stator of pump 36 will be immediately shifted to cut down its pumping rate to the minimum and pump 21 will be operated without delay to dispense measured quantities of liquid.

Assuming that, due to a leaky foot valve 16 or to vaporization in the suction pipe 14, the level of liquid has fallen so that chamber 53 and pipe 14 are empty. Then on starting up of motor 22, the metering pump 21 will not operate but pump 36 will operate at a high rate and quickly exhaust pipe 14, its extension 48 and the chamber 53. Repriming of the system will be effected more quickly than it can be with the dispensing apparatus now commonly used and the metering pump will be started up with only a short delay.

In case the suction pipe is filled with gasoline vapor, these vapors will be recovered to a substantial extent because in passing through pump 36 and chamber 38 they are put under pressure in the presence of gasoline and that is the best way to insure condensing of such vapors. It will be noted that chamber 38 cannot drain back into chamber 53 and that once this chamber is primed, there is always liquid present in the chamber to assist in the work of condensing the fuel vapors.

An important feature of the invention disclosed will be seen from the following consideration. A pump and a meter are used as separate elements in prior art dispensing apparatus. The power is turned on before delivery begins. The ordinary pump is provided with a relief valve controlled by-pass. It by-passes liquid in proportion to the delivery rate. Before and after delivery, but while the apparatus is otherwise operating, all pumped liquid is automatically by-passed around the pump. The pump is then in full operation. So a meter mechanism for measuring deliveries could not operate as the pump is operating when there is no delivery being made. Thus, the common practice is to operate the meter as a separate element and by the movement or flow of liquid during actual delivery. In contrast to this prior art arrangement my power-operated pump is adapted to also function as a meter. One reason it can do so is due to the absence of any automatic by-pass. However, this omission of a by-pass to take care of a variable rate of delivery while the power is on, requires special consideration and provision for a different mode of operation. My special provision is the type of clutch included in my combination. My clutch slips in proportion to the rate of delivery. When the rate is zero, the slip is enough to stop the pump. At maximum delivery rate, the clutch has a minimum slip. At intermediate delivery rates at the dispensing nozzle the clutch has intermediate slippage rates. They are all automatic and controlled by the delivery rate. The back pressure of the liquid transmits the power in the form of resistance to control the clutch automatically. Thus, the arrangement of this combination is new and useful, regardless of the presence or absence of any air separator element. It has use in an apparatus regardless of how or whether any separation takes place.

The apparatus supplies a definite need in the field of gasoline dispensers. It provides a mechanically-driven meter in place of that driven by liquid pressure and thereby enables the registering mechanism to be driven by the same motor that drives the meter. Substantially lower pressures may be used since the meter-pump 21 need develop only so much pressure as is necessary for forcing the liquid through the delivery conduit at the desired velocity. No additional pressure is necessary, as heretofore, to carry the load of driving the registering mechanism. The arrangement provides a positive and reliable drive for the registering mechanism under all conditions of service normally encountered. The meter pump need not be made with such close tolerances as heretofore and thus may be made more cheaply and at the same time the liability of the pistons and valves sticking because of gummy gasolines is substantially lessened.

The apparatus consumes less power than those now in use having equal performance characteristics. In particular, a smaller motor may be used because of the low starting torque required due to the use of the slip clutch. So also the power consumption is low, instead of high as at present, when the motor is operated with the nozzle 33 closed. The slip clutch, in effect, unloads the motor insofar as the load of the metering pump is concerned. The power consumed for scavenging varies with the need and normally will be low because pump 36 will be working at its minimum rate and against very little pressure.

The apparatus may be manufactured at a cost no greater than that now used. The only additional element is the hydraulic clutch and this is relatively inexpensive. The cost of the clutch is more than offset by the savings in meter construction.

Thus, the invention offers a cheaper, better and more reliable apparatus for the field of gasoline dispensing, with lessened cost for power to operate it and more reliable, safer operation and improved air separation. The separation, occurring at sub-atmospheric pressure, is more readily and thoroughly accomplished and the fire hazard is less as there is no chance for gasoline to be discharged from the main separator except by pump 36 and then not at high pressure, such as is now being used (the dispensing pressures of around 18 lbs. per square inch). The pressure used will be just enough to raise the liquid into separator 42 and not enough to eject liquid therefrom. So, the system of air separation is safer. It also affords air elimination always proportioned to the need. Rapid scavenging for initial priming or the clearing of a gas-filled suction line is always available and yet when there is no such need, the scavenging pump works at a low rate, using little power.

What I claim is:

1. In apparatus for measuring and dispensing liquid, a storage tank for the liquid, a gas and liquid separator, a suction pipe connecting said tank and separator, and opening into the separator at a level substantially above the bottom thereof, a metering pump of the positively-acting displacement type connected to the separator near the bottom thereof to draw air-free liquid only therefrom, registering means connected to said pump to be driven when the pump is driven, a single pump for the combined purposes of priming said metering pump by filling said separator with liquid and for scavenging the air and gases therefrom, said last-named pump connected to the separator above said level, a motor, and means responsive to the presence and absence of liquid in the upper part of said separator for respectively coupling and uncoupling the motor to said metering pump and connected registering means.

2. In apparatus for measuring and dispensing liquid, a storage tank for the liquid, a gas and liquid separator, a suction pipe connecting said tank and separator, and opening into the separator at a level substantially above the bottom thereof, a metering pump of the positively-acting displacement type connected to the separator near the bottom thereof to draw air-free liquid only therefrom, registering means connected to said pump to be driven when the pump is driven, a single pump for the combined purposes of priming said metering pump by filling said separator with liquid and for scavenging the air and gases therefrom, said last-named pump connected to the separator above said level, and means for driving both said pumps and said registering means, the driving means for the metering pump and connected registering means including clutch means responsive to the presence or absence of liquid in the upper part of said separator and operable to connect and disconnect the metering pump and registering means from said driving means.

3. In apparatus for measuring and dispensing liquid, a storage tank for the liquid, a gas and liquid separator, a suction pipe connecting said tank and separator, and opening into the separator at a level substantially above the bottom thereof, a metering pump of the positively-acting displacement type connected to the separator near the bottom thereof to draw air-free liquid only therefrom, registering means connected to said pump to be driven when the pump is driven, a scavenging pump connected to the separator above said level and operable to remove air and gases therefrom, and means for driving both said pumps and said registering means, the driving means for the metering pump and connected registering means including a hydraulic clutch located in the upper portion of the separator and operable to drive the metering pump and registering means only when liquid is present in said portion.

4. In apparatus for measuring and dispensing liquid, a storage tank for the liquid, a gas and liquid separator, a suction pipe connecting said tank and separator, and opening into the separator at a level substantially above the bottom thereof, a metering pump of the positively-acting displacement type connected to the separator near the bottom thereof to draw air-free liquid only therefrom, registering means connected to said pump to be driven when the pump is driven, a scavenging pump connected to the separator above said level and operable to remove air and gases therefrom, means for driving both said pumps and said registering means, the driving means for the metering pump and connected registering means including a hydraulic clutch located in the upper portion of the separator and operable to drive the metering pump and registering means only when liquid is present in said portion, and a delivery conduit, connected to the outlet of the metering pump and having a valve for opening and closing the same, said clutch slipping when said valve is closed whereby the metering pump is stopped and the driving means is relieved of the load of driving the same.

5. In apparatus for measuring and dispensing liquid, a storage tank for the liquid, a gas and liquid separator, a suction pipe connecting said tank and separator, and opening into the separator at a level substantially above the bottom thereof, a metering pump of the positively-acting displacement type connected to the separator near the bottom thereof to draw air-free liquid only therefrom, registering means connected to said pump to be driven when the pump is driven, a scavenging pump connected to the separator above said level and operable to remove air and gases therefrom, said scavenging pump having a chamber receiving its discharge and having a restricted outlet, means responsive to the pressure in said chamber for varying the capacity of the scavenging pump, decreasing it as the pressure rises and increasing it as the pressure falls, and means for driving both pumps and said registering means, said driving means including means responsive to the presence or absence of liquid in the upper part of the separator to connect the driving means to or disconnect the driving means from said metering pump and connected registering means.

6. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having its driven element connected to said pump, a driving motor connected to the driving element of the clutch, and means connected to said upper chamber for scavenging the separator to remove air and gases therefrom, said pump and motor being operably connected only when liquid rises into the upper chamber and reaches said clutch elements.

7. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having its driven element connected to said pump, a driving motor connected to the driving element of the clutch, the driven clutch element having a port through which liquid enters to reach the driving element, a valve for said port for partially closing said port when the driven element is at rest, and means responsive to the speed of the driven element for moving said valve to increase the effective area of said port, and means connected to said upper chamber for scavenging the separator, said driving element being operable to turn the driven element only when the separator has been scavenged sufficiently for liquid to rise to the level of the port in the driven element.

8. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having its driven element connected to said pump, a variable-capacity scavenging pump of the positively-acting displacement type located in said upper chamber and having its inlet in constant communication therewith and having an outlet passage, a driving motor connected to drive the scavenging pump and connected to the driving element of said clutch, and means responsive to the pressure in said passage for varying the capacity of said scavenging pump, increasing or diminishing it as the pressure falls and rises respectively.

9. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having driving and driven elements, said driven element connected to said pump, one of said clutch elements having an inlet port communicating with said chamber, a variable-capacity scavenging pump of the positively-acting displacement type located in said chamber and having its inlet in constant communication therewith at a level above that of the inlet port of said clutch and having an outlet passage, a driving motor connected to drive the scavenging pump and connected to the driving element of said clutch, and means responsive to the pressure in said passage for varying the capacity of said scavenging pump, increasing or diminishing it as the pressure falls and rises respectively.

10. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having its driven element connected to said pump, a variable-capacity scavenging pump of the positively-acting displacement type located in said upper chamber and having its inlet in constant communication therewith and having an outlet passage, a driving motor connected to drive the scavenging pump and connected to the driving element of said clutch, said separator having a third chamber located adjacent the upper chamber and receiving the discharge from said outlet passage, said third chamber having an outlet of less area than said passage, and pressure-responsive means in the third chamber for varying the capacity of the scavenging pump, increasing and diminishing it as the pressure in said chamber falls and rises, respectively.

11. In liquid dispensing apparatus, an air separator having upper and lower chambers interconnected for the free flow of fluids from one to the other, a metering pump connected to draw liquid from the lower part of the lower chamber and deliver it to a desired point of discharge, an inlet conduit for the separator and communicating with the lower chamber at a level substantially above the outlet to said pump, a hydraulic clutch located in the upper chamber and having its driven element connected to said pump, a variable-capacity scavenging pump of the positively-acting displacement type located in said upper chamber and having its inlet in constant communication therewith and having an outlet passage, a driving motor connected to drive the scavenging pump and connected to the driving element of said clutch, said separator having a third chamber located adjacent the upper chamber and receiving the discharge from said outlet passage, said third chamber having an outlet of less area than said passage, pressure-responsive means in the third chamber for varying the capacity of the scavenging pump, increasing and diminishing it as the pressure in said chamber falls and rises, respectively, and means connected to the outlet of the third chamber for separating air and liquid and venting the air to the atmosphere and returning the liquid to said lower chamber.

12. A liquid dispensing apparatus particularly adapted for the sale of motor fuel such as gasoline, said apparatus including a single element acting both as a pump and a meter, an intake conduit for said element, a registering mechanism having means to indicate a metering operation of said element, and driving means to simultaneously and synchronously insure the driving operation of said element and registering mechanism in a positive manner without putting any of the driving load on the liquid in said element, said means including a hydraulic clutch consisting of a centrifugal pump and hydraulic turbine located in said conduit, said clutch being automatically operable to make its driving connection when the conduit is sufficiently supplied with liquid ready to be metered and to avoid its driving connection when the conduit is not so supplied.

13. A liquid dispensing apparatus particularly adapted for the sale of motor fuel such as gasoline, a positively-acting displacement meter, a supply conduit and a discharge conduit therefor, means for driving said meter in a positive manner, whereby the meter functions also as a pump, a registering mechanism for said meter connected to said driving means for synchronous operation with the meter, a priming and scavenging means connected in parallel with and slightly above said meter pump to scavenge air and gases from the supply conduit and for priming the same by suction, a conduit separate from said dispensing discharge conduit through which separate conduit the scavenged air and gases are discharged, and a clutch for said driving means operable in response to the presence or absence of liquid in said supply conduit so as to engage for driving when liquid is there present and to disengage from driving when liquid is not present, whereby the said driving means operates the registering mechanism only when liquid is present for priming the meter operation.

14. A liquid dispensing apparatus particularly adapted for the sale of motor fuel such as gasoline, comprising a suction conduit adapted for connection at one end to a source of supply, a chamber for trapping liquid and to which the other end of said conduit is connected at a level substantially spaced above its bottom, said chamber having an outlet for liquid located near said bottom, a positively-acting displacement meter having its intake connected to said outlet, a dispensing line connected to the outlet of said meter, means for driving said meter in a positive mechanical fashion, whereby the meter functions also as a pump, a registering mechanism connected directly to said driving means for synchronous operation with the meter, a clutch for said driving means responsive to the presence or absence of liquid in the upper part of said chamber to couple or uncouple the driving means to or from said pump and registering mechanism, a scavenging and priming pump connected to the upper part of said chamber, and a discharge pipe for said last-named pump for conducting all of the discharge therefrom.

15. A liquid dispensing apparatus particularly adapted for the sale of motor fuel such as gasoline, comprising a suction conduit adapted for connection at one end to a source of supply, a chamber for trapping liquid and to which the other end of said conduit is connected at a level substantially spaced above its bottom, said chamber having an outlet for liquid located near said bottom, a positively-acting displacement meter having its intake connected to said outlet, a dispensing line connected to the outlet of said meter, means for driving said meter in a positive mechanical fashion, whereby the meter functions also as a pump, a registering mechanism for said meter connected directly to said driving means for synchronous operation with the meter, a clutch for said driving means responsive to the presence or absence of liquid in the upper part of said chamber to couple or uncouple the driving means to or from said pump and registering mechanism, a variable capacity pump for scavenging air and gases from said suction conduit and chamber and priming said meter, a separate discharge pipe for said last-named pump, and means for varying the capacity of the last-named pump according to the need for scavenging, increasing it when air and gases are present and diminishing it when liquid is present.

16. A liquid dispensing apparatus, particularly adapted for the sale of motor fuel such as gasoline, said apparatus having a dispensing conduit with intake means at one end for connection to the source of liquid supply and a shut-off valve at the other end thereof, a single element acting both as a pump and a meter and interposed in said conduit, a registering mechanism having means to indicate a metering operation of said element, driving means to simultaneously and synchronously insure the driving operation of said element and registering mechanism in a positive manner without putting any of the driving load on the liquid in said element, said driving means including a hydraulic clutch having as driving and driven elements a centrifugal pump and hydraulic turbine, the closing of the outlet of said conduit by said valve being adapted solely through the action of back pressure in said conduit to stop said pump and meter element, the driven element of said clutch, and the flow of liquid from said source through said intake means, notwithstanding that the driving element of the clutch is continued in operation.

WARREN H. De LANCEY.